(12) United States Patent
Price et al.

(10) Patent No.: US 11,244,460 B2
(45) Date of Patent: Feb. 8, 2022

(54) DIGITAL IMAGE BOUNDARY DETECTION

(71) Applicant: Adobe Inc., San Jose, CA (US)

(72) Inventors: Brian Lynn Price, Pleasant Grove, UT (US); Peng Zhou, College Park, MD (US); Scott David Cohen, Cupertino, CA (US); Gregg Darryl Wilensky, New York, NY (US)

(73) Assignee: Adobe Inc., San Jose, CA (US)

( * ) Notice: Subject to any disclaimer, the term of this patent is extended or adjusted under 35 U.S.C. 154(b) by 83 days.

(21) Appl. No.: 16/822,853

(22) Filed: Mar. 18, 2020

(65) Prior Publication Data

US 2021/0295525 A1 Sep. 23, 2021

(51) Int. Cl.
*G06T 7/00* (2017.01)
*G06T 7/13* (2017.01)

(52) U.S. Cl.
CPC ...... *G06T 7/13* (2017.01); *G06T 2207/20081* (2013.01); *G06T 2207/20084* (2013.01)

(58) Field of Classification Search
CPC ............. G06T 7/13; G06T 2207/20081; G06T 2207/20084
See application file for complete search history.

(56) References Cited

PUBLICATIONS

Ling et al., "Fast Interactive Object Annotation with Curve-GCN", Mar. 16, 2019, Computer Vision foundation IEEE Xplore, pp. 52575266 (Year: 2019).*

Cheng et al., "DARNet: Deep Active Ray Network for Building Segmentation", May 15, 2019, Computer Vision Foundation IEEE Xplore, pp. 7431-7439 (Year: 2019).*
"Stunning Free Images to Use Anywhere—Pixabay", Retrieved at: https://pixabay.com/—on Jan. 2, 2020, 7 pages.
Acuna,"Devil is in the Edges: Learning Semantic Boundaries from Noisy Annotations", Jun. 9, 2019, 9 pages.
Acuna,"Efficient Interactive Annotation of Segmentation Datasets with Polygon-RNN++", Mar. 26, 2018, 21 pages.
Alvarez,"Morphological snakes", Jul. 2010, 6 pages.
Avidan,"Seam Carving for Content-Aware Image Resizing", ACM Transactions on Graphics 2007, Jul. 2007, 9 pages.
Barron,"The Fast Bilateral Solver", Jul. 22, 2016, 50 pages.
Benenson,"Large-scale interactive object segmentation with human annotators", Apr. 17, 2019, 10 pages.
Boykov,"Interactive Graph Cuts for Optimal Boundary & Region Segmentation of Objects in N-D Images", Proceedings of International Conference on Computer Vision, Vancouver, Canada, vol. 1, Jul. 2001, pp. 105-112.

(Continued)

*Primary Examiner* — Ping Y Hsieh
(74) *Attorney, Agent, or Firm* — FIG. 1 Patents

(57) ABSTRACT

In implementations of object boundary generation, a computing device implements a boundary system to receive a mask defining a contour of an object depicted in a digital image, the mask having a lower resolution than the digital image. The boundary system maps a curve to the contour of the object and extracts strips of pixels from the digital image which are normal to points of the curve. A sample of the digital image is generated using the extracted strips of pixels which is input to a machine learning model. The machine learning model outputs a representation of a boundary of the object by processing the sample of the digital image.

20 Claims, 12 Drawing Sheets

(56) References Cited

PUBLICATIONS

Canny, "A Computational Approach to Edge Detection", IEEE Transactions On Pattern Analysis and Machine Intelligence, vol. PAMI-8, No. 6, Nov. 6, 1986, 20 Pages.
Castrejon, "Annotating Object Instances with a Polygon-RNN", Apr. 18, 2017, 9 pages.
Chen, "Collaborative Global-Local Networks for Memory-Efficient Segmentation of Ultra-High Resolution Images", Oct. 24, 2019, 10 pages.
Chen, "Encoder-Decoder with Atrous Separable Convolution for Semantic Image Segmentation", Aug. 22, 2018, 18 pages.
Cheng, "DARNet: Deep Active Ray Network for Building Segmentation", May 15, 2019, 18 pages.
Deng, "Learning to Predict Crisp Boundaries", Jul. 26, 2018, 18 pages.
Glorot, "Deep Sparse Rectifier Neural Networks", Jan. 2011, 9 pages.
He, "Bi-Directional Cascade Network for Perceptual Edge Detection", Feb. 28, 2019, 4321-4330.
He, "Guided Image Filtering", In European conference on computer vision. Springer, Sep. 2010, 14 pages.
Kass, "Snakes: Active Contour Models", International Journal of Computer Vision, 1 (4): pp. 321-331 (1988), Jan. 1988, 11 Pages.
Khoreva, "Video Object Segmentation with Language Referring Expressions", Feb. 5, 2019, 24 pages.
Kipf, "Semi-Supervised Classification with Graph Convolutional Networks", Feb. 22, 2017, 14 pages.
Kopf, "Joint Bilateral Upsampling", ACM Transactions on Graphics (Proceedings of SIGGRAPH 2007, 26(3): 96, Aug. 2007, 5 pages.
Krahenbuhl, "Efficient Inference in Fully Connected CRFs with Gaussian Edge Potentials", Dec. 14, 2011, 9 pages.
Le, "Interactive Boundary Prediction for Object Selection", Oct. 9, 2018, 16 pages.
Li, "Interactive Image Segmentation with Latent Diversity", Jun. 2018, 9 pages.
Li, "Lazy Snapping", In Proc. of ACM SIGGRAPH, Apr. 2004, 6 pages.
Ling, "Fast Interactive Object Annotation with Curve-GCN", Mar. 16, 2019, 10 pages.
Liu, "Richer Convolutional Features for Edge Detection", Aug. 2019, pp. 1939-1946.
Marcos, "Learning deep structured active contours end-to-end", Mar. 16, 2018, 9 pages.
Opelt, "A Boundary-Fragment-Model for Object Detection", ECCV, May 2006, 14 pages.
Osher, "Fronts Propagating with Curvature Dependent Speed: Algorithms Based on Hamilton-Jacobi Formulations", Jan. 1988, 38 pages.
Perazzi, "A Benchmark Dataset and Evaluation Methodology for Video Object Segmentation", Dec. 2016, pp. 724-732.
Ronneberger, "U-Net: Convolutional Networks for Biomedical Image Segmentation", May 18, 2015, 8 pages.
Rother, ""GrabCut"—Interactive Foreground Extraction using Iterated Graph Cuts", ACM SIGGRAPH 2004, Aug. 2004, 6 pages.
Rupprecht, "Deep Active Contours", Jul. 18, 2016, 16 pages.
Sudre, "Generalised Dice overlap as a deep learning loss function for highly unbalanced segmentations", Jul. 14, 2017, 8 pages.
Sun, "Deep High-Resolution Representation Learning for Human Pose Estimation", Feb. 25, 2019, 12 pages.
Tang, "GrabCut in One Cut", Dec. 2013, 8 pages.
Ulyanov, "Instance Normalization: The Missing Ingredient for Fast Stylization", Nov. 6, 2017, 6 pages.
Wang, "Detect Globally, Refine Locally: A Novel Approach to Saliency Detection", Jun. 2018, 9 pages.
Wang, "Object Instance Annotation with Deep Extreme Level Set Evolution", Oct. 2019, 9 pages.
Wong, "3D Segmentation with Exponential Logarithmic Loss for Highly Unbalanced Object Sizes", Sep. 24, 2018, 9 pages.
Wu, "Fast End-to-End Trainable Guided Filter", Sep. 25, 2019, 10 pages.
Xie, "Holistically-Nested Edge Detection", Oct. 4, 2015, 10 pages.
Xu, "Deep Interactive Object Selection", Mar. 13, 2016, 9 pages.
Yang, "Object Contour Detection with a Fully Convolutional Encoder-Decoder Network", Mar. 15, 2016, 10 pages.
Yu, "Simultaneous Edge Alignment and Learning", Oct. 26, 2018, 30 pages.
Zhang, "Residual Dense Network for Image Super-Resolution", Mar. 27, 2018, 10 pages.
Zhao, "ICNet for Real-Time Semantic Segmentation on High-Resolution Images", Aug. 20, 2018, 16 pages.
Zhao, "Pyramid Feature Attention Network for Saliency detection", Apr. 4, 2019, 10 pages.

* cited by examiner

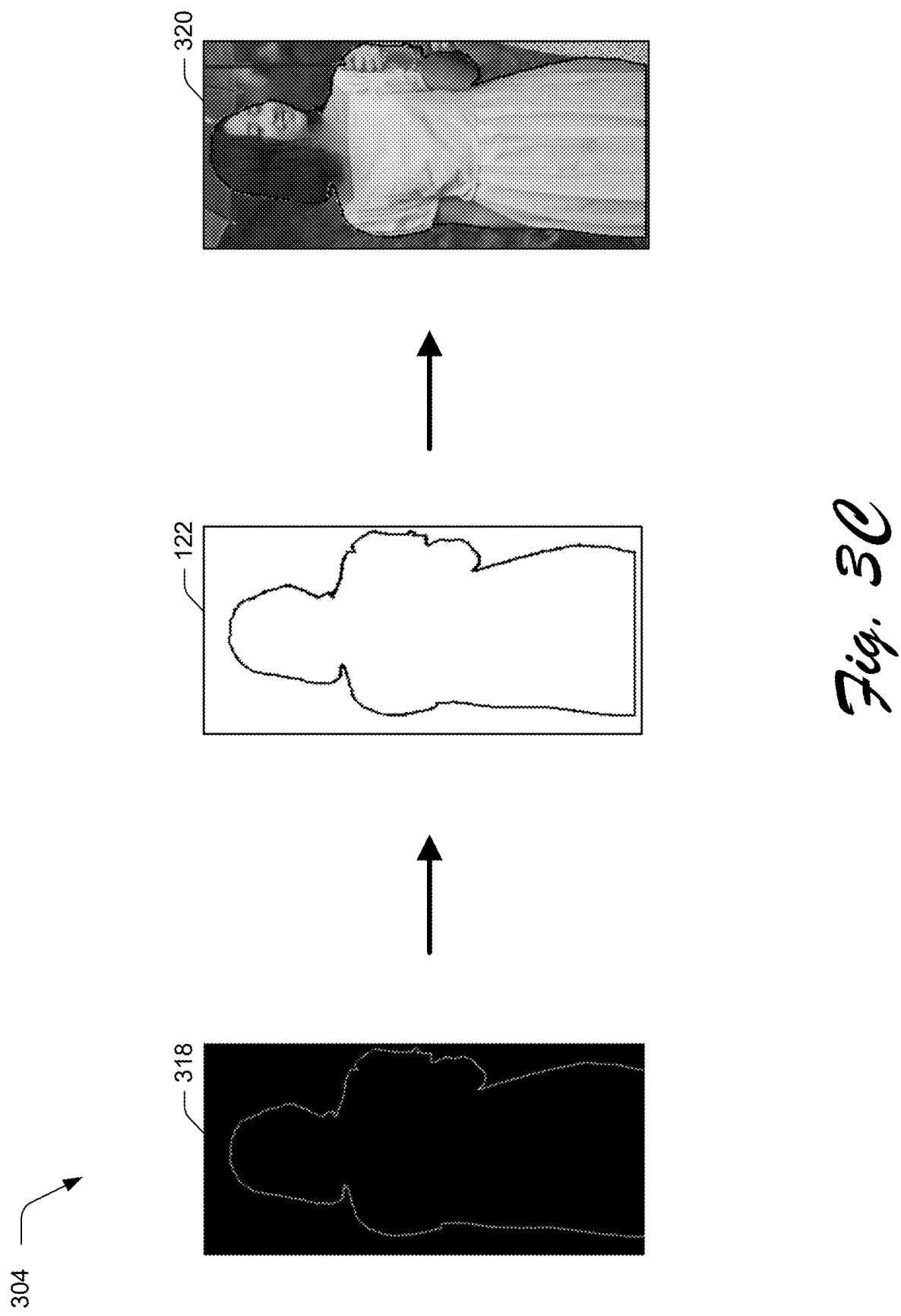

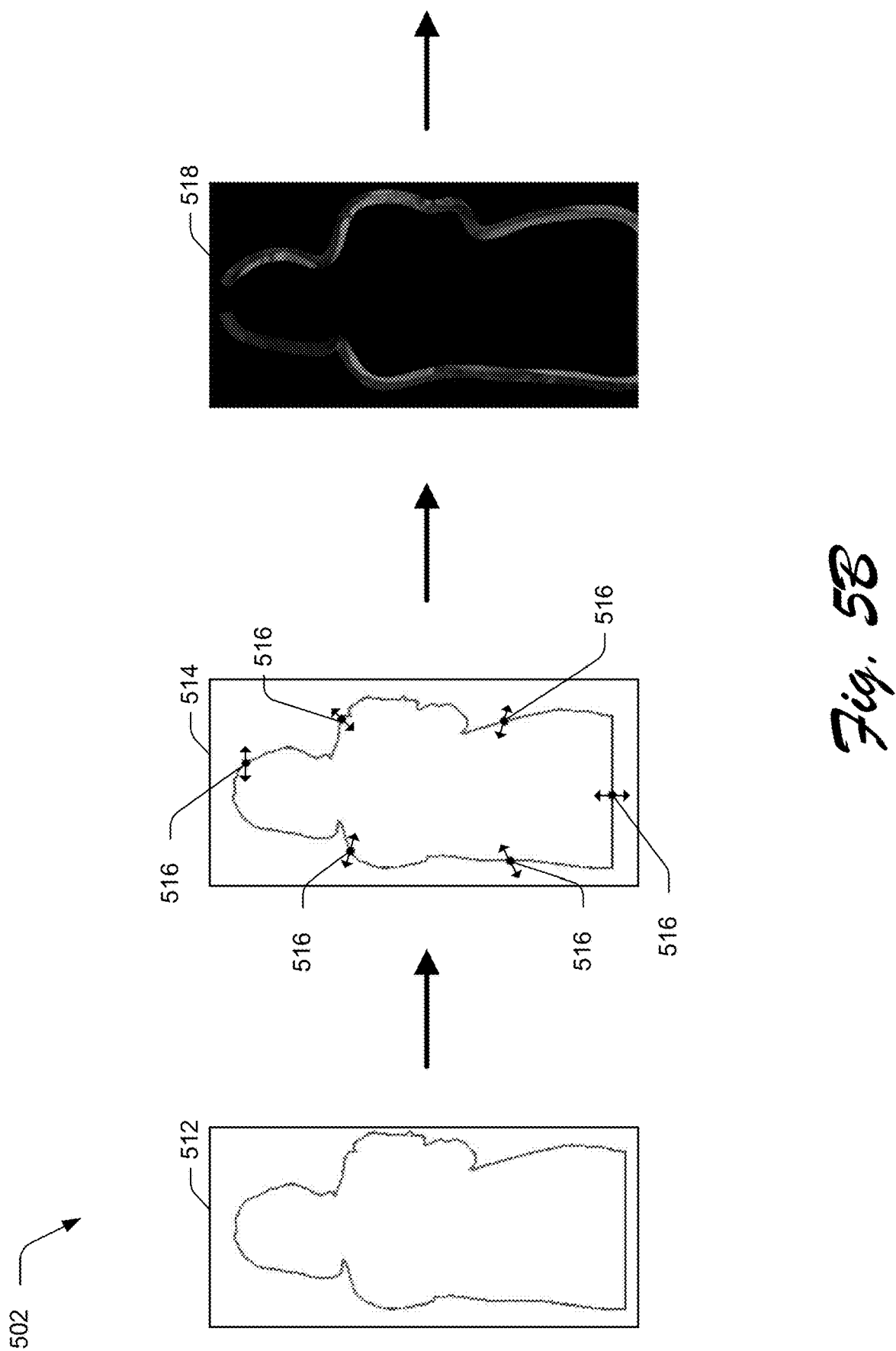

DIGITAL IMAGE BOUNDARY DETECTION

BACKGROUND

Boundary detection is used by digital image processing systems to support a wide range of functionality. However, conventional boundary detection techniques are prone to error and are computationally inefficient, and as such limits the accuracy of functionality that relies on these conventional boundary detection techniques.

In one conventional example, a user input is received via a user interface to manually draw a boundary around an object within a digital image, e.g., using touchscreen functionality, a cursor control device, and so on. This boundary is then used in this example to segment the object from the digital image, such as to move the object within the digital image, modify visual characteristics of pixels defining the object, move the object to another digital image, and so on. However, reliance on manual user inputs is typically prone to error, such as by selecting portions of the digital image that do not include the object, do not pixels that are part of the object, result in jagged edges, and so on.

Accordingly, conventional techniques have also been developed to improve accuracy in defining a boundary within a digital image by a digital image processing system. However, these conventional techniques also lack precision and are computationally inefficient such that these conventional techniques are not applicable to typical digital image sizes as collected by current mobile computing devices (e.g., smart phones) due to memory constraints of these conventional techniques.

Conventional techniques, for instance, are memory constrained as being limited by a size of a receptive field of the machine learning model. The receptive field is a size of a region in an input to a machine learning model that can affect an output of the machine learning model. In other words, the receptive field defines an overall size of data that is capable of being processed by the machine learning model. Even when implemented using substantial computational and memory resources (e.g., in the cloud), the receptive field size typically limits current machine learning models to processing digital images having approximately 0.25 million pixels.

This size is considered low resolution digital images when compared with the size of digital images captured by current digital cameras. For example, digital images captured using a typical smartphone camera have approximately 8-16 million pixels, and digital images captured with a professional digital camera can have as much as 16-400 million pixels. Therefore, conventional machine learning models are forced to make compromises and how to process these high-resolution digital images. In one such example, conventional techniques first generate low resolution object boundaries, which are then upsampled for use with the high resolution digital image. Consequently, the high resolution object boundaries generated using conventional systems are typically inaccurate and frequently exclude portions of an object of interest and include portions of the digital image that are not of interest. Further, the use of sampling typically results in jagged edges that do not follow actual object boundaries. As such, the limitations of these conventional techniques have a direct effect on accuracy of digital image processing techniques that rely on object detection, such as object segmentation, background removal, and so forth.

SUMMARY

Systems and techniques are described for object boundary generation. In one example, a computing device implements a boundary system to receive data (e.g., a mask) defining a contour of an object depicted in a digital image. The mask, for instance, may define the contour of the object in a lower resolution than the digital image, and the mask can be generated using a variety of techniques such as downsampling, background segmentation, etc. The boundary system maps a curve (e.g., mathematically) to the contour of the object and upsamples the curve to match a resolution as the digital image. This upsampled curve therefore approximates a boundary of the object depicted in the digital image, e.g., in its native resolution.

The boundary system then uses the upsampled curve to generate a sample from the digital image that follows the curve. This is performed by the boundary system by extracting pixels of the digital image in strips which are perpendicular to points of the upsampled curve. The extracted strips of pixels include pixels depicting the boundary of the object. The boundary system generates the sample as a strip image depicting the extracted strips of pixels.

The boundary system then processes the sample using a machine learning model. The machine learning model is trained using training data that includes training digital images and corresponding ground truths that indicate boundaries of objects included within respective training digital images. As part of the training, for instance, the machine learning model generates a predicted boundary based on a respective sample taken from a training digital image using the techniques described above. The predicted boundary is then compared to a boundary as defined by the ground truth for the training digital image using a loss function in order to train the machine learning model.

The machine learning model, once trained, is thus configured to process the sample and from this detect the boundary for the object contained within the digital image. The boundary may then be leveraged by the system in a variety of ways, such as for object removal, background removal image processing of the object, and so on. In this way, the boundary system is able to employ machine learning using the sample that was not possible in conventional techniques that processed the digital image as a whole, e.g., such as by downsampling an entirety of the digital image.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. Entities represented in the figures may be indicative of one or more entities and thus reference may be made interchangeably to single or plural forms of the entities in the discussion.

FIGS. 3A, 3B, and 3C are illustrations of example representations of digital image boundary detection.

FIGS. 5A, 5B, and 5C are illustrations of example representations of generating training data for training a machine learning model.

DETAILED DESCRIPTION

Overview

Figure 1:
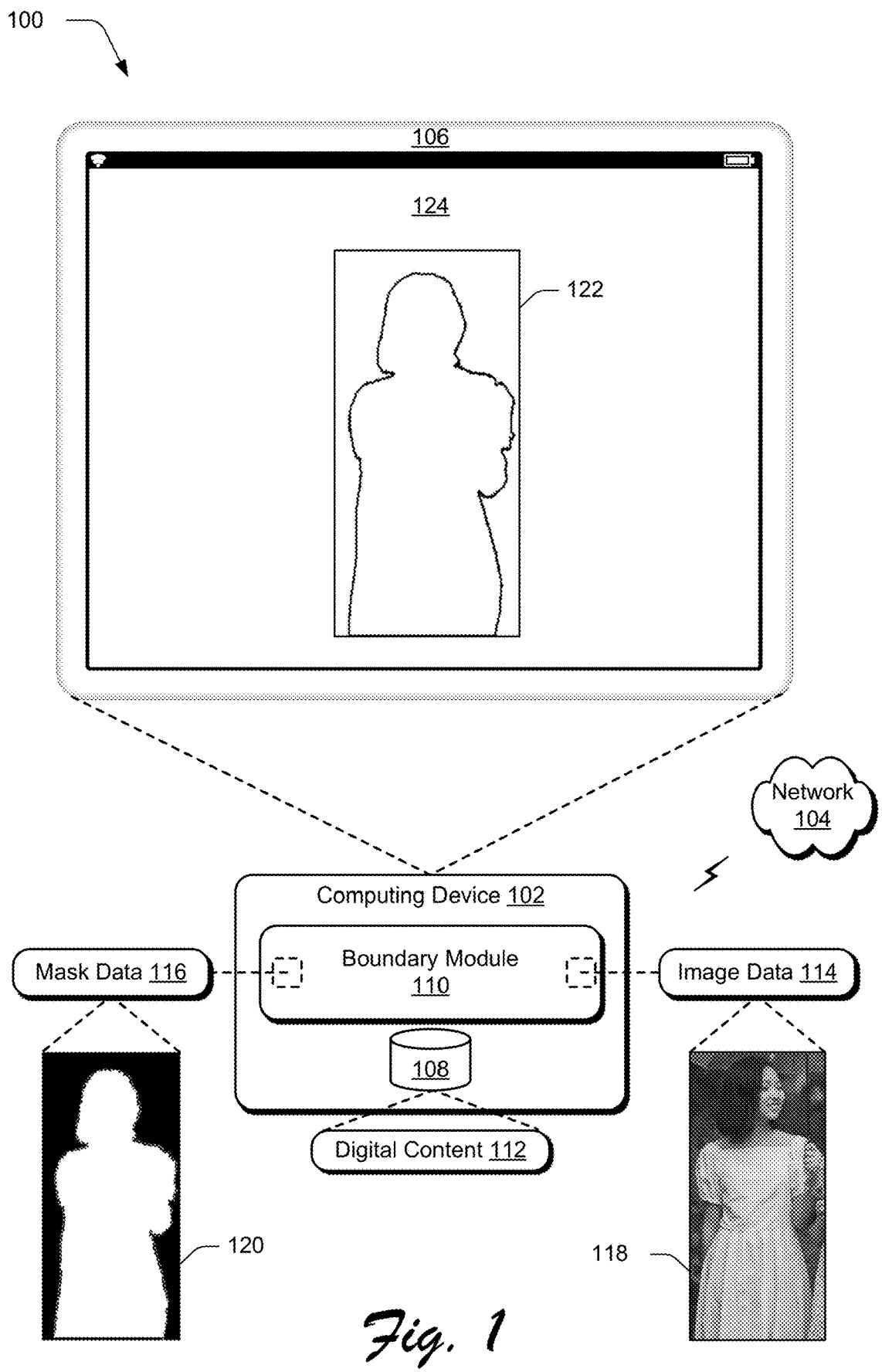
FIG. 1 is an illustration of an environment in an example implementation that is operable to employ digital systems and techniques for digital image boundary detection of objects as described herein.

Boundary detection is used to support a wide range of digital image processing functionality. As previously described, conventional techniques to do so initially relied on a user's ability to manually define the boundary via interaction with a user interface. Consequently, these initial conventional techniques are prone to error, the likelihood of which may be exacerbated by complexities in a boundary of the object, such as for a user's ability to manually trace complex object shapes in a user interface using a cursor control device. Subsequent techniques were then developed to assist in boundary detection through use of a machine learning model. However, as described above these conventional techniques are constrained by an amount of data that may be processed at any one time. As such, these conventional techniques are not capable of addressing digital image sizes as captured by smart phones and professional digital cameras in typical real-world scenarios.

Accordingly, systems and techniques are described for boundary detection that overcome the limitations of conventional techniques. The systems and techniques improve operation of computing devices to support use of high-resolution digital images that are incapable of being processed using conventional techniques.

In one example, a computing device implements a boundary system to generate a boundary based on a digital image. To do so, a contour is first defined with respect to an object in the digital image. The contour may be defined in a variety of ways. For example, the contour may be defined manually via a user input, through use of layering, foreground subtraction, downsampling, soft edge masking, and so on to represent the contour as a mask. This may be performed, for instance, with respect to a downsampled version of the digital image to generate a mask that defines which pixels of the digital image correspond to the object and which pixels do not.

The boundary system then maps a curve, mathematically, based on the contour of the object. In one example, this curve is a parametric curve, such as a quadratic curve, a cubic Bezier curve, and so on that is mathematically fit to the contour. In this way, the curve may be resized mathematically and yet still maintain accuracy, e.g., to maintain accuracy. The boundary system, for instance, may then resize the curve to support the resolution of the digital image as received by the boundary system.

The curve is then used by the boundary system to generate a sample from the digital image having a subset of pixels that are to be used to detect the boundary. The sample, for instance, may have a size that that is less than an overall size of the digital image. In this way, the techniques described herein may overcome the challenges and limitations of conventional techniques to employ machine learning at a native resolution of a digital image, e.g., as received by the boundary system.

To do so in one example, the boundary system iteratively progresses through points of the curve and computes a direction perpendicular to the curve at each of these points with respect to the digital image. The boundary system then extracts the strips of pixels from the digital image such that the strips of pixels are perpendicular to the points of the curve based on the computed directions in order to form the sample.

As a result, the boundary system generates the sample as extracted strips of pixels that are likely to include the boundary of the object from the digital image. This sample maintains a resolution that matches a resolution of the digital image, but is a fraction of a size of the overall digital image. Thus, the sample is likely to include pixels that depict a boundary of the object along with semantic content disposed adjacent to the boundary. In this way, the boundary system generates the sample as including high resolution semantic contents of the digital image in a manner suitable for processing using a machine learning model, which is not possible using conventional techniques. For example, the boundary system generates the sample in a size small enough for a receptive field of the machine learning model yet still retains high-resolution details.

The boundary system then processes the sample using a machine learning model. The machine learning model is trained using training data that includes training digital images and corresponding ground truths that indicate boundaries of objects included within respective training digital images. As part of the training, for instance, the machine learning model generates a predicted boundary based on a respective sample taken from a training digital image using the techniques described above. The predicted boundary is then compared to a boundary as defined by the ground truth for the training digital image using a loss function in order to train the machine learning model.

The machine learning model, once trained, is thus configured to process the sample and from this generate the boundary for the object contained within the digital image. The boundary system, for instance, may map a representation of the boundary to corresponding pixels of the digital image as described above, this may be used to support a variety of functionality, including object segmentation, object manipulation, and so forth. For example, the boundary system maps the representation of the object boundary by referencing coordinates which describe locations of pixels extracted from and depicted in the digital image.

The described boundary detection techniques and systems improve computer-based technology for generating boundaries of objects depicted in digital images with increased accuracy than conventional systems by improving operation of a computing device that implements these techniques. This technological improvement is demonstrated in the following discussion also by comparing accuracy of boundaries generated for objects using the techniques described herein as contrasted with boundaries generated by conventional techniques.

The described systems also improve functionality of the computing device. This computing technology improvement is exhibited by comparing computational resources used to detect boundaries for objects using conventional systems with resources used to detect boundaries for the objects using the described systems and techniques. The described systems detect boundaries for the objects in significantly less time and using substantially less memory than conventional machine learning based systems. In this way, the described systems and techniques improve computational efficiency of the computing device over conventional machine learning techniques.

Term Descriptions

As used herein, the term "high resolution digital image" refers to a digital image having more than about 0.25 million pixels. By way of example, high resolution digital images can include digital images captured using a typical smartphone camera having about 8-16 million pixels. By way of additional example, high resolution digital images can include digital images captured with a professional camera having about 16-400 million pixels.

As used herein, the term "semantic content" of a digital image refers to what is depicted in the digital image. By way of example, semantic content of a digital image can refer to objects depicted in the digital image or features of objects depicted in the digital image.

As used herein, the term "machine learning model" refers to a computer representation that can be tuned (e.g., trained) based on inputs to approximate unknown functions. By way of example, the term "machine learning model" can include a model that utilizes algorithms to learn from, and make predictions on, known data by analyzing the known data to learn to generate outputs that reflect patterns and attributes of the known data. According to various implementations, such a machine learning model uses supervised learning, semi-supervised learning, unsupervised learning, or reinforcement learning. For example, the machine learning model can include, but is not limited to, clustering, decision trees, support vector machines, linear regression, logistic regression, Bayesian networks, random forest learning, dimensionality reduction algorithms, boosting algorithms, artificial neural networks (e.g., fully-connected neural networks, deep convolutional neural networks, or recurrent neural networks), deep learning, etc. By way of example, a machine learning model makes high-level abstractions in data by generating data-driven predictions or decisions from the known input data.

As used herein, the term "mask" refers to an image mask. By way of example, a mask can be used to define a contour of an object depicted in a digital image. A mask, for instance, may assign tags to pixels such as to define which pixels correspond to an object and which pixels do not. Thus, the contour may be defined in a mask of adjacent pixels having different tags.

As used herein, the term "contour" of an object refers to an outline of the object. By way of example, a contour of an object can define a shape of the object.

As used herein, the term "boundary" of an object refers to an edge of an object. By way of example, pixels within a boundary of an object depict the object and pixels outside of the boundary of the object do not depict the object.

As used herein, the term "sample" refers to an amount that is less than an entire amount. By way of example, a sample of pixels from a digital image refers to an amount of pixels that is less than all of the pixels included in the digital image.

In the following discussion, an example environment is first described that may employ the techniques described herein. Example procedures are also described which may be performed in the example environment as well as other environments. Consequently, performance of the example procedures is not limited to the example environment and the example environment is not limited to performance of the example procedures.

Example Environment

FIG. 1 is an illustration of an environment 100 in an example implementation that is operable to employ digital systems and techniques as described herein. The illustrated environment 100 includes a computing device 102 connected to a network 104. The computing device 102 may be configured as a desktop computer, a laptop computer, a mobile device (e.g., assuming a handheld configuration such as a tablet or mobile phone), and so forth. Thus, the computing device 102 may range from a full resource device with substantial memory and processor resources (e.g., personal computers, game consoles) to a low-resource device with limited memory and/or processing resources (e.g., mobile devices). Additionally, the computing device 102 may be representative of a plurality of different devices, such as multiple servers utilized by a business to perform operations "over the cloud."

The illustrated environment 100 also includes a display device 106 that is communicatively coupled to the computing device 102 via a wired or a wireless connection. A variety of device configurations may be used to implement the computing device 102 and/or the display device 106. The computing device 102 includes a storage device 108 and a boundary module 110. The storage device 108 is illustrated as including digital content 112, which may be configured as a digital image or other types of digital content having digital images included therein.

The boundary module 110 is illustrated as having, receiving, and/or transmitting image data 114 and mask data 116. The image data 114 describes digital images depicting objects and the image data 114 is illustrated to include a digital image 118 that depicts an object. In this example, the object depicted in the digital image 118 is a girl wearing a white dress.

The mask data 116 describes masks of objects depicted in digital images of the image data 114. The mask data 116 is illustrated to include a mask 120 which defines a contour of the object depicted in the digital image 118 at a lower resolution than the digital image. For example, the image data 114 describes high resolution digital images depicting objects and the mask data 116 describes low resolution masks defining contours of objects depicted in the high resolution digital images. These contours represent outlines of the objects depicted in the high resolution images.

The mask data 116 can be generated using any suitable technique for extracting a low resolution mask from a high resolution digital image. For example, the mask data 116 may be generated using object segmentation, layering, downsampling, edge approximation, soft edge masking, foreground subtraction, etc. In one example, the mask data 116 can be generated using manual specifications. In another example, the mask data 116 may be generated using edge refinement.

The computing device 102 implements the boundary module 110 to process the image data 114 and the mask data 116 for object boundary generation. In one example, the computing device implements the boundary module 110 to generate an object boundary 122 which is rendered in a user interface 124 of the display device 106. As shown, the object boundary 122 defines an outer edge of the girl wearing the white dress in a high resolution, e.g., in a same resolution as the digital image 118.

The boundary module 110 can map the object boundary 122 to the digital image 118 as a segmentation boundary of the object depicted in the digital image 118. Although the mask data 116 and the image data 114 are illustrated separately, it should be appreciated that the boundary module 110 includes functionality capable of generating the mask data 116 from the image data 114. The boundary module 110 can do this using any known system or technique for generating a 1 mask for an object depicted in a digital image.

Figure 2:
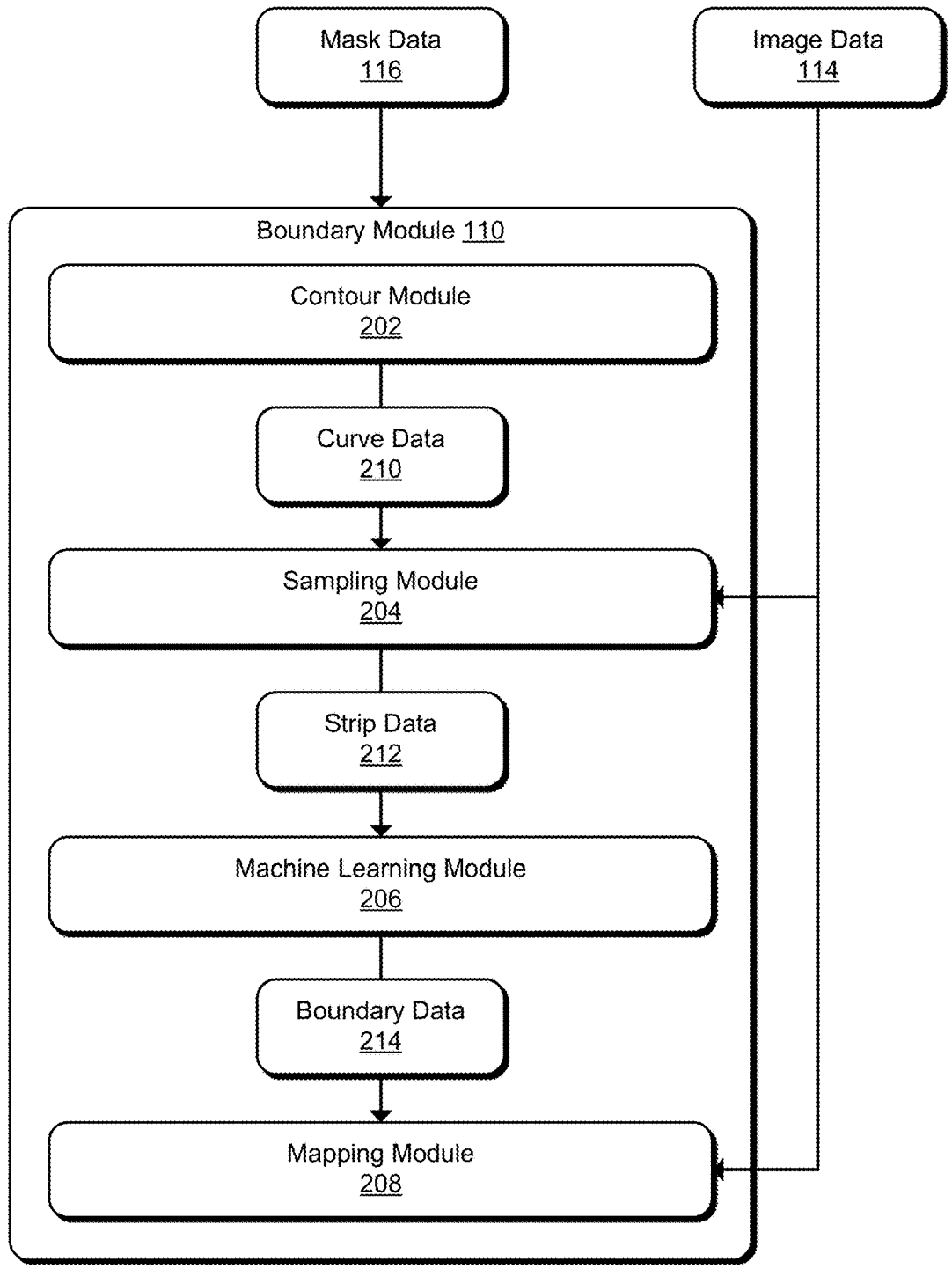
FIG. 2 depicts a system in an example implementation showing operation of a boundary module for digital image boundary detection for objects.

FIG. 2 depicts a system 200 in an example implementation showing operation of a boundary module 110. The boundary module 110 is illustrated to include a contour module 202, a sampling module 204, a machine learning module 206, and a mapping module 208. The contour module 202 in this example receives the mask data 116 describing low resolution masks of objects depicted in high resolution digital images described by the image data 114. These low resolution masks described by the mask data 116 can be generated using any known system or technique for generating a low resolution mask for an object depicted in a high resolution digital image. The contour module 202 processes the mask data 114 to generate curve data 210 as described and shown in the following.

Figure 3A:
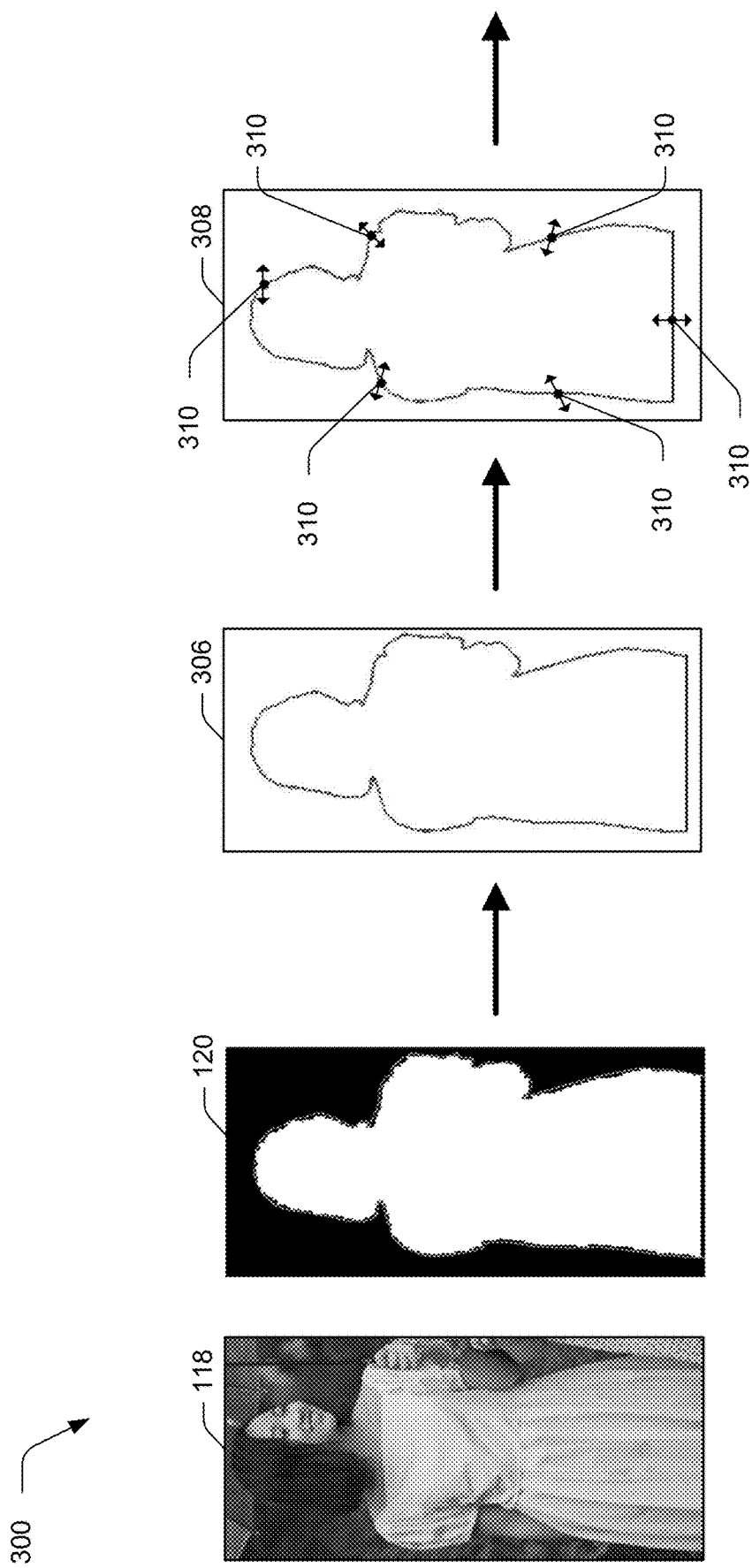
Figure 3B:
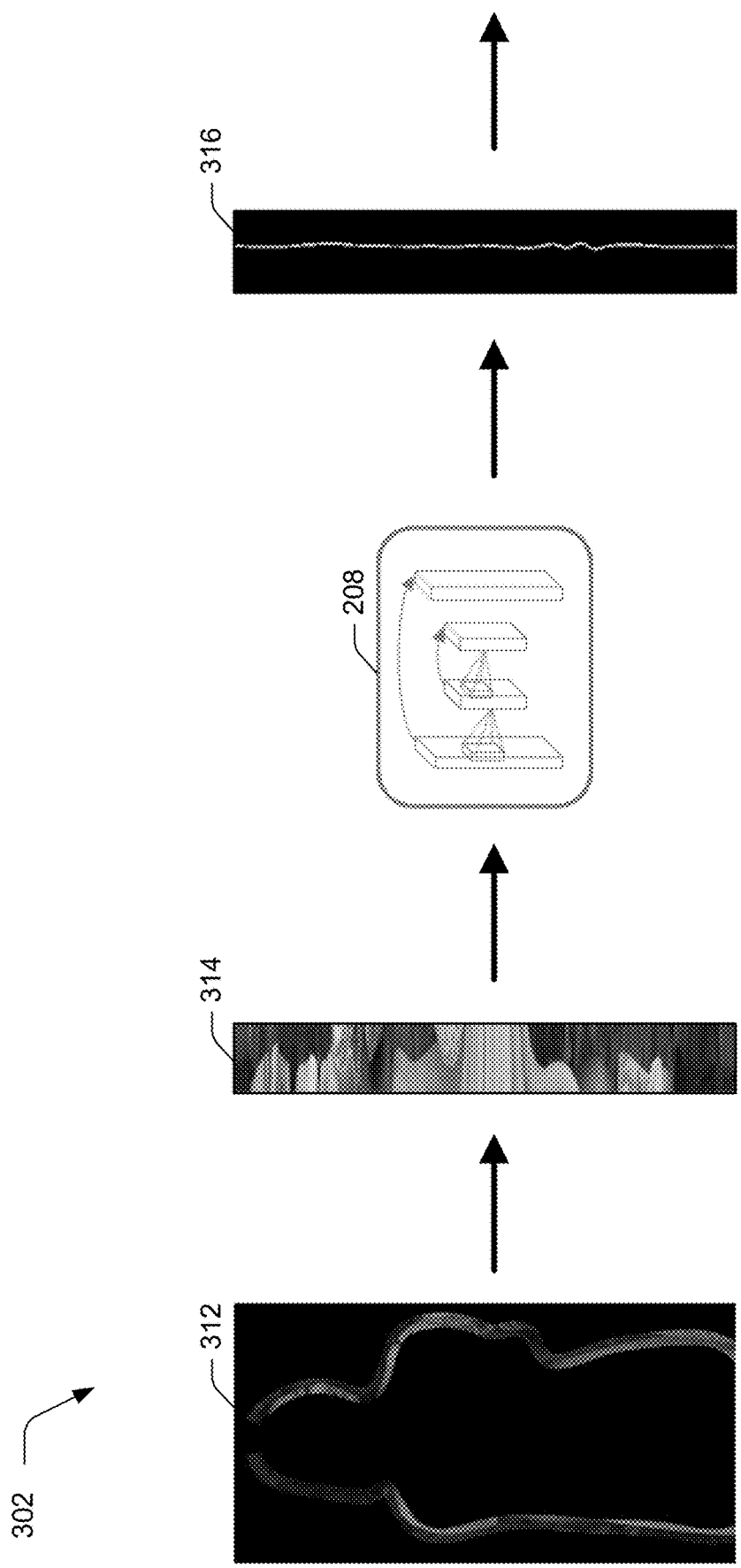

FIGS. 3A, 3B, and 3C are illustrations of example representations of detecting object boundaries in digital images. FIG. 3A illustrates an example representation 300 of mapping a curve to a contour of an object. FIG. 3B illustrates an example representation 302 of generating a representation of a boundary of the object. FIG. 3C illustrates an example representation 304 of mapping the representation of the boundary of the object to a digital image as a segmentation boundary of the object.

The contour module 202 processes the mask data 116 to map a curve 306 to the contour of the object depicted in the mask 120. For example, the contour represents an outline of the object depicted in the high resolution digital image. FIG. 3A illustrates an example of the curve 306. In one example, the curve 306 is a parametric curve, such as a quadratic or a cubic Bezier curve. For example, the curve 306 can be a B-spline curve, a kappa curve, Catmull-Rom curve, etc. In another example, the curve 306 may be generated by upsampling the mask 120 (e.g., using nearest-neighbor, bilinear, or bicubic upsampling).

The contour module 202 upsamples the curve 306 to generate an upsampled curve 308. For example, the contour module 202 generates the upsampled curve 308 as having a same resolution as the digital image 118 mathematically. In one example, the curve 306 is defined for a downsampled version of the digital image 118 and the upsampled curve 308 has a resolution corresponding to a resolution of the digital image 118. The contour module 202 then generates the curve data 210 as describing the upsampled curve 308.

The sampling module 204 receives and processes the curve data 210 describing the upsampled curve 308 and the image data 114 describing the digital image 118 to sample the digital image 118 at points 310 along the upsampled curve 308. In one example, the sampling module 204 samples the digital image 118 by extracting pixels depicted in the digital image 118 proximal to the points 310 along the upsampled curve 308. For example, the sampling module 204 can iteratively step or proceed along the upsampled curve 308 and extract pixels from the digital image 118 within a defined threshold of the points 310 to generate a sample. In an example, the sampling module 204 extracts pixels neighboring the points 310 which can include nearest neighboring pixels to the points 310 as well as pixels neighboring the nearest neighboring pixels, etc.

As shown in FIG. 3A, the sampling module 204 iteratively steps or proceeds along the upsampled curve 308 and computes a direction that is perpendicular to each of the points 310. The sampling module 204 uses these computed directions to extract the sample from the digital image 118 in strips of pixels that are perpendicular to the points 310. These strips of pixels have a defined width based on a threshold such that pixels defining the boundary of the object in the digital image 118 have a likelihood of being included within the strips. In this example, the threshold distance may be one pixel, two pixels, three pixels, and so forth. The sampling module 204 extracts the sampled strips of pixels from the digital image 118 to generate a sample 312.

In some examples, the sampling module 204 iteratively steps along the upsampled curve 308 in step sizes of one pixel. In these examples, a first point 310 and a next point 310 of the points 310 may represent adjacent pixels of the digital image 118 along the upsampled curve 308. In another example, the first point 310 and the next point 310 may be separated by one pixel. For example, the sampling module 204 can iteratively step or proceed along the upsampled curve 308 by two or three pixel long steps. Gaps between samples along the upsampled curve 308 can be filled in by connecting the samples using any suitable method such as interpolation.

As shown in FIG. 3B, the sampling module 204 generates the sampled image 312 as including the strips of pixels extracted from the digital image 118. Thus, the sampled image 312 depicts pixels of the digital image 118 which define the boundary of the object. This is illustrated as a narrow region of pixels from the digital image 118 along the edge of the upsampled curve 308. The sampling module 204 uses this narrow region of pixels to generate a strip image 314.

The sampling module 204 generates the strip image 314 as the sample by unfolding the narrow region of pixels depicted in the sampled image 312, e.g., at a constant step size along the upsampled curve 308. In this manner, the sample configured as the strip image 314 includes pixels that are likely to detect portions of the boundary of the object depicted in the digital image 118. The sample as configured as the strip image 314 is also a high resolution image having a resolution that matches a native resolution of the digital image 118, yet is a fraction of a size of the digital image 118 and as such supports processing by machine learning model.

Consider an example in which the digital image 118 is a high resolution digital image such as a digital photograph as captured by conventional mobile phones and dedicated digital cameras. In this example, the digital image 118 may not be effectively processed using conventional techniques as an input to a machine learning model trained to predict boundaries of objects. This is because the machine learning model is limited to processing input images that are small enough for a receptive field of the machine learning model. The receptive field defines a size of a region in the digital image 118 that can affect an output of the model. This limits machine learning models to processing input digital images 118 having up to around 0.25 million pixels even when using substantial computational and memory resources of the computing device 102. However, through use of the sample as a strip image 314, a high resolution may be maintained yet still support processing by machine learning model. In this manner, the sample is small enough for the receptive field of the machine learning model to process and the sample and yet also includes the high resolution pixels of interest.

The machine learning module 206 receives the strip data 212 and processes the strip data 212 to generate boundary data 214. For example, the machine learning module 206 includes a convolutional neural network trained on training data to predict boundaries based on strip image inputs. Because the strip image 314 is generated from pixels of the digital image 118 which are perpendicular to the points 310, the machine learning module 206 may process the strip data 212 in a normal or perpendicular direction instead of making determinations based on two dimensions. In this manner, the machine learning module 206 processes the strip data 212 in one dimension instead of two dimensions which improves computational efficiency and increases accuracy of boundary predictions.

As illustrated in FIG. 3B, the machine learning module 206 processes the sample configured as a strip image 314 (described by the strip data 212) and generates a representation of a boundary 316 of the object depicted in the digital image 118. In one example, the representation of the boundary 316 is mapped to the digital image 118 to segment the object from a background of the digital image 118. Other examples are also contemplated, including manipulation of pixels that are solely contained within the object, modification of a background so as not to include the object, and so on. The machine learning module 206 generates the boundary data 214 as describing the representation of the boundary 316.

The mapping module 208 receives the boundary data 214 and processes the boundary data 208 to map the representation of the boundary 316 to the digital image 118. The boundary data 214 includes coordinates which describe the location in the digital image 118 of the pixels included in the strip image 314. For every pixel of the strip image 314, corresponding coordinates in the digital image 118 are recorded for reconstruction. For example, the mapping module 208 processes the representation of the boundary 316 and determines a path with a minimum energy cost as indicating a highest probability boundary path to generate a strip recovery 318 which is illustrated in FIG. 3C.

The mapping module 208 generates the object boundary 122 using the strip recovery 318 in one example. To do so, the mapping module maps the object boundary 122 to the digital image 118 using the recorded coordinates in the digital image 118 to generate a segmentation boundary 320. As shown in FIG. 3C, the segmentation boundary 320 accurately indicates an outer edge of the object depicted in the digital image 118.

Although the object depicted in the digital image 118 includes a single contour, it is to be understood that the described systems are capable of predicting boundaries for objects including multiple and/or complex contours. For example, an object having a doughnut shape includes an outer contour and an inner contour. In this example, the boundary module 110 predicts boundaries for the outer contour and the inner contour separately.

Even though the system 200 is described as including a contour module 202, a sampling module 204, a machine learning module 206, and a mapping module 208, it should be appreciated that the system 200 can be implemented in any number of modules. For example, the system 200 can may be implemented using fewer modules than illustrated. In one example, the system 200 is implemented as a single module. In another example, the system 200 can be implemented with additional modules as well.

In general, functionality, features, and concepts described in relation to the examples above and below may be employed in the context of the example procedures described in this section. Further, functionality, features, and concepts described in relation to different figures and examples in this document may be interchanged among one another and are not limited to implementation in the context of a particular figure or procedure. Moreover, blocks associated with different representative procedures and corresponding figures herein may be applied together and/or combined in different ways. Thus, individual functionality, features, and concepts described in relation to different example environments, devices, components, figures, and procedures herein may be used in any suitable combinations and are not limited to the particular combinations represented by the enumerated examples in this description.

Example Procedures

Figure 4:
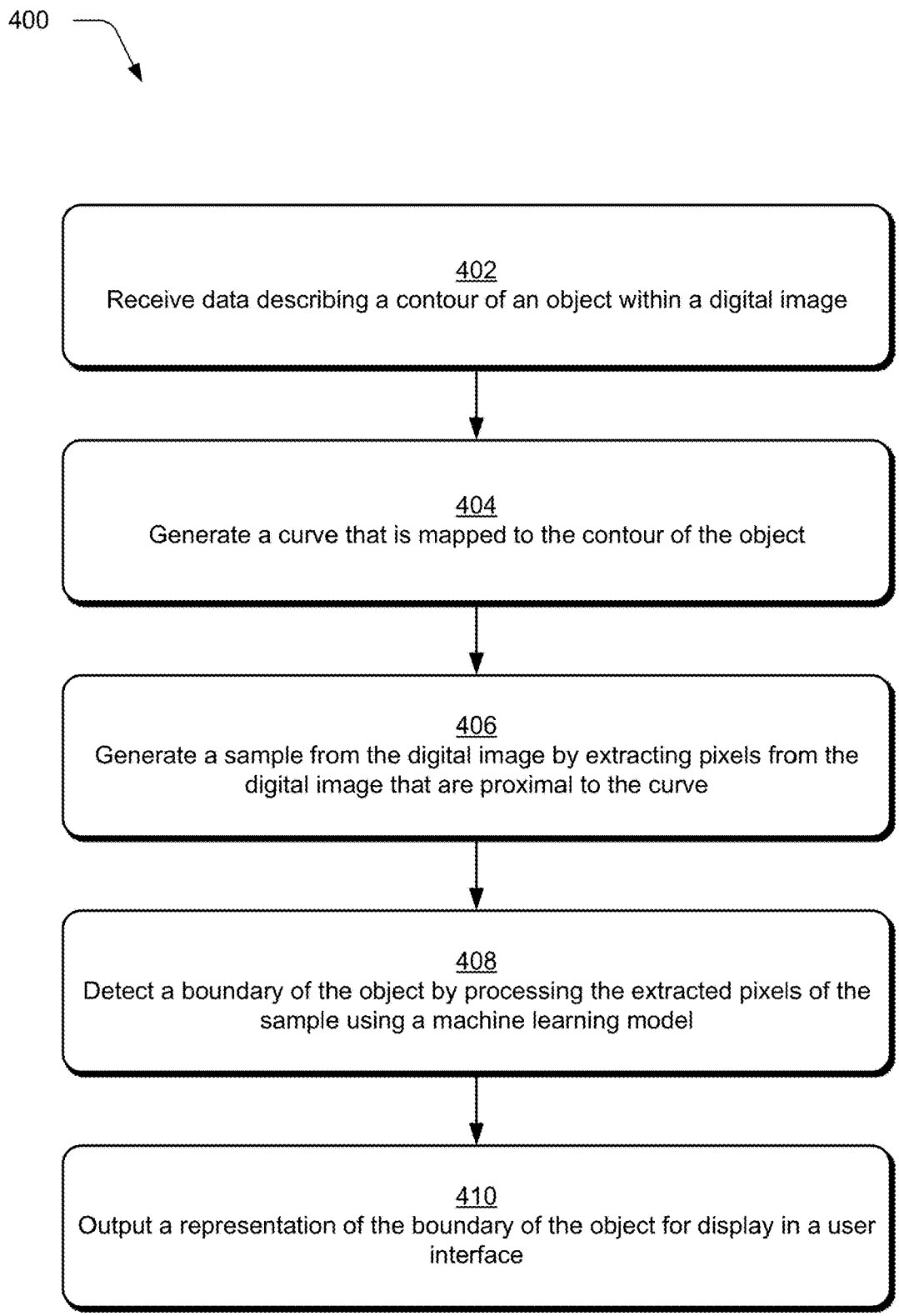
FIG. 4 is a flow diagram depicting a procedure in an example implementation in which data describing a contour of an object within a digital image is received and a representation of a boundary of the object is output for display in a user interface.

The following discussion describes techniques that may be implemented utilizing the previously described systems and devices. Aspects of each of the procedures may be implemented in hardware, firmware, software, or a combination thereof. The procedures are shown as a set of blocks that specify operations performed by one or more devices and are not necessarily limited to the orders shown for performing the operations by the respective blocks. In portions of the following discussion, reference may be made to FIGS. 1-3. FIG. 4 is a flow diagram depicting a procedure 400 in an example implementation in which data describing a contour of an object within a digital image is received and a representation of a boundary of the object is output for display in a user interface.

Data describing a contour of an object within a digital image is received (block 402). The computing device 102 implements the boundary module 110 to receive the data in one example. A curve that is mapped to the contour of the object is generated (block 404). For example, the boundary module 110 generates the curve that is mapped to the contour of the object. A sample from the digital image is generated by extracting pixels from the digital image that are proximal to the curve (block 406). The boundary module 110 can generate the sample from the digital image.

A boundary of the object is detected by processing the extracted pixels of the sample using a machine learning model (block 408). In one example, the computing device 102 implements the boundary module 110 to detect the boundary of the object. A representation of the boundary of the object is output for display in a user interface (block 410). For example, the boundary module 110 outputs the representation of the boundary of the object.

Figure 5A:
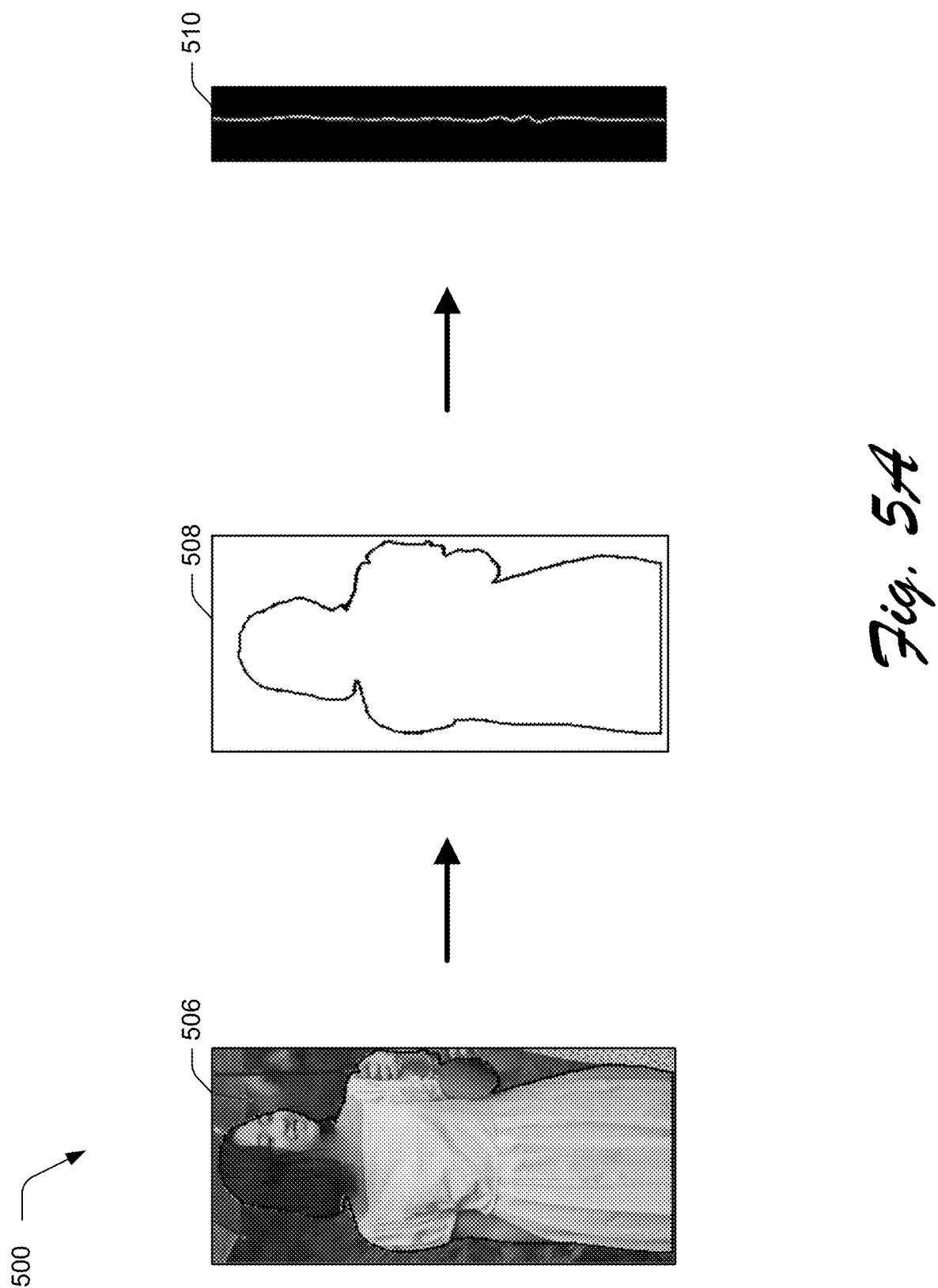
Figure 5C:
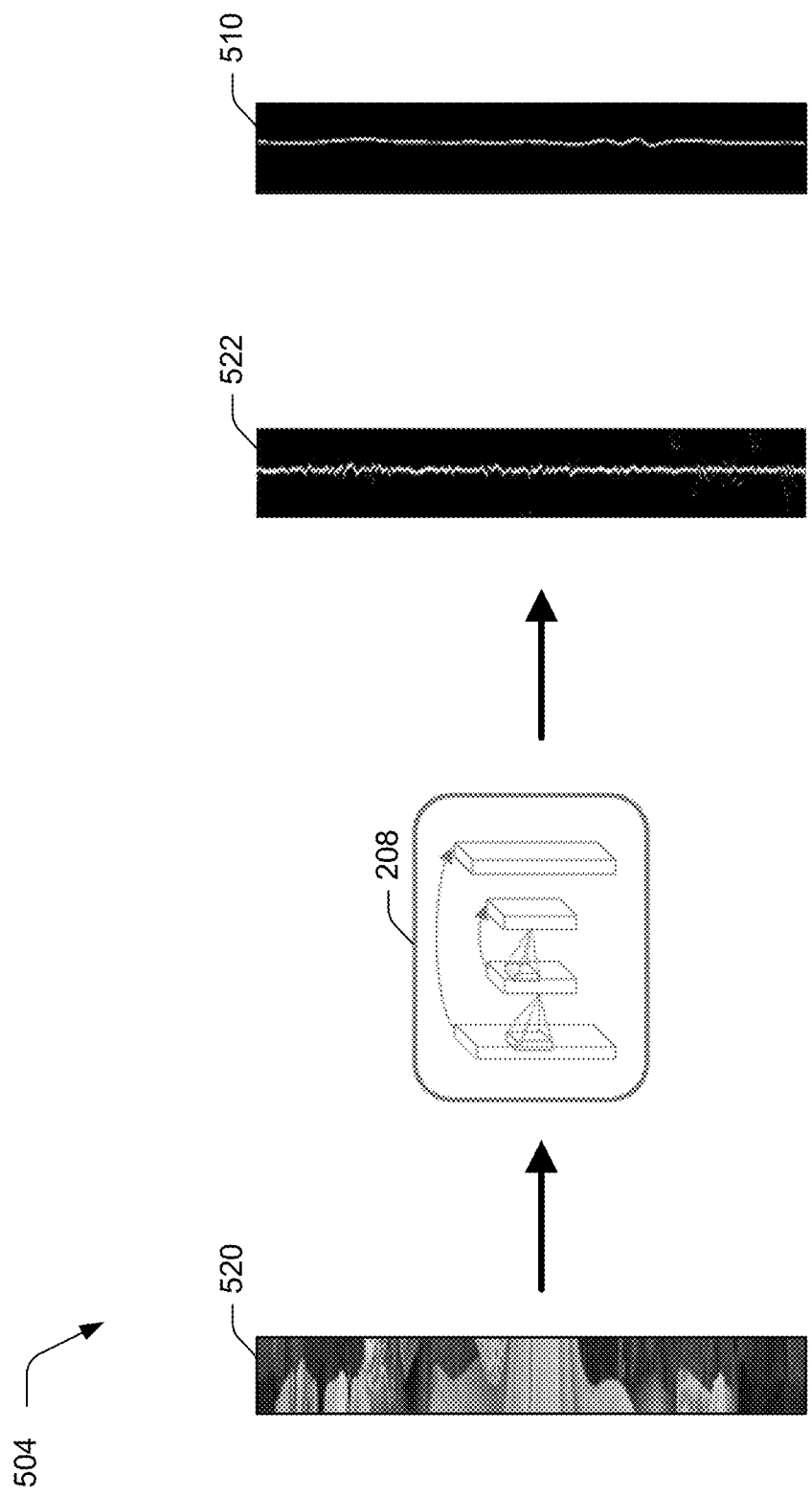

FIGS. 5A, 5B, and 5C are illustrations of example representations of generating training data for training a machine learning model. FIG. 5A illustrates an example representation 500 of a ground truth object boundary. FIG. 5B illustrates an example representation 502 of generating a strip image. FIG. 5C illustrates an example representation 504 of a predicted object boundary.

As shown in FIG. 5A, the representation includes a ground truth digital image 506 depicting an object and a segmentation boundary of the object. The computing device 102 implements the boundary module 110 to represent the segmentation boundary depicted in the ground truth digital image 506 as a ground truth curve 508. For example, the ground truth curve 508 can be a B-spline curve, a kappa curve, a Catmull-Rom curve, etc. The ground truth curve 508 is unfolded as a ground truth representation of a boundary 510 of the object depicted in the ground truth digital image 506. In one example, the boundary module 110 generates the ground truth representation of the boundary 510 by unfolding the ground truth curve 508 at a constant step size. In an example in which a portion of the ground truth representation of the boundary 510 is discontinuous and does not include boundary pixel, the boundary module 110 adds labels to the portion such that the ground truth representation of the boundary 510 is continuous.

As illustrated in FIG. 5B, the boundary module 110 generates a lower resolution curve 512 by downsampling the ground truth curve 508. For example, the boundary module 110 generates the lower resolution curve 512 at a lower resolution than the ground truth digital image 506. The boundary module 110 then generates a target curve 514 using the lower resolution curve 512 such that the target curve 514 has a same resolution as the ground truth digital image 506. In some examples, the boundary module 110 may randomly add small shifts to the target curve 514 to introduce position variation during training.

As illustrated, the boundary module 110 samples the ground truth digital image 506 at points 516 along the target curve 514. To do so, the boundary module 110 extracts strips of pixels from the ground truth digital image 506 such that the strips of pixels are perpendicular to the points 516. In one example, the boundary module 110 determines a direction perpendicular to the points 516 by calculating a derivative of an equation which defines the target curve 514 which may be expressed as:

$$(normal_x, normal_y) = \left(-\frac{\partial f_c(x, y)}{\partial y}, \frac{\partial f_c(x, y)}{\partial x}\right)$$

where: $f_c$ is a spline representation of the target curve 514 and $normal_x$, $normal_y$ are the normal two-dimensional directions.

The boundary module 110 then generates a sampled target image 518 as including strips of pixels extracted from the ground truth digital image 506. As shown, the sampled target image 518 includes a narrow region of pixels from the ground truth digital image 506. The boundary module 110 generates a target strip image 520 by unfolding the narrow region of pixels depicted in the sampled target image 518.

For example, given a high resolution digital image I(p,q) and a representation of a boundary contour C=(p(k),q(k)) where (p(k),q(k)) denotes the high resolution digital image coordinates parameterized by arc length k along the curve, a continuous strip image $J_{l,c}$ may be expressed as:

$$J_{l,C}\left(k, t + \frac{H}{2}\right) = I(p(k) + t \times n_p(k), q(k) + t \times n_q(k))$$

where: t denotes distance in a normal direction; H denotes height of the strip image; and ($n_p(k)$, $n_q(k)$) is a unit normal to the curve at arc length k.

Accordingly, the strip image $J_{l,C}$(j,i) with dimension H×W is obtained by sampling k=j×dk,t=i×dt where a tangential step size dk=[|C|/W] and normal step size dt may be set to 1 for simplicity.
where: ICI denotes a length of C; j=0, 1, . . . , W; and i=−H/2, . . . , 0, . . . H/2.

In one example, bilinear interpolation may be applied in the high resolution digital image to evaluate I(p,q) for non-pixel coordinates (p,q).

As illustrated in FIG. 5C, the target strip image 520 is input to the machine learning module 206 which processes the target strip image 520 to generate a predicted representation of a boundary 522. The boundary module 110 can train a machine learning model of the machine learning module 206 by comparing the predicted representation of the boundary 522 and the ground truth representation of the boundary 510. For example, a pixel-wise weighted $l_1$ loss between the prediction and ground truth $L_{l_1}$ and dice loss $L_{dice}$ may be applied for training to avoid label unbalance. Formally, the pixel-wise weighted $l_1$ loss may be expressed as:

$$L_{l_1} = \mu \sum_{(i,j) \in Y_+} |y_{ij} - s_{ij}| + (1 - \mu) \sum_{(i,j) \in Y_-} |y_{ij} - s_{ij}|$$

where: $Y_+$ denotes boundary pixels; $Y_-$ denotes non-boundary pixels; $\mu = |Y_-|/|Y|$ and denotes a weight to balance the label; $|Y|$ is a total number of pixels in the strip mask; and $s_{ij}$ denotes the prediction and $y_{ij}$ denotes the binary ground truth at position (i,j) in the strip image.

Additionally, the dice loss $L_{dice}$ encourages intersection between a prediction and ground truth by maximizing an intersection over union between the prediction and ground truth which can be expressed as:

$$L_{dice} = 1 - \frac{2 \sum s_{ij} \times y_{ij} + \in}{\sum s_{ij} + \sum y_{ij} + \in}$$

where: $\in$ denotes a small constant to avoid zero division.

To encourage a predicted edge approaching a ground truth in strip space, a measured distance between the predicted edge and the ground truth can define a loss function as follows:

$$L_{strip} = \|\text{argmax}_w(s) - \text{argmax}_w(gt)\|_1$$

where: $\text{argmax}_w$ is a soft argmax along the width of the strip; s is the strip edge prediction; and gt is the ground truth edge in strip space.

To avoid edge discontinuity, a $c_0$ continuity constraint can be enforced on the prediction. For example, the $c_0$ continuity constraint ensures continuous predictions by penalizing discontinuous portions of the prediction. This constraint is converted into minimizing the following margin loss:

$$L_{con} = \max\left(\left\|\frac{\partial \text{argmax}_w(s)}{\partial l}\right\|_1 - m, 0\right)$$

where: l is the length of the strip and m is the margin.

The machine learning model of the machine learning module 206 may then be trained with the following total loss:

$$L_{total} = L_{l_1} + L_{dice} + \alpha L_{strip} + \beta L_{con}$$

where: hyper parameters are manually set α to 0.2 and β to 10 according to cross validation.

In one example, the machine learning model can be adapted from U-Net as described by O. Ronneberger, P. Fischer, and T. Bronx, U-Net: *Convolutional Networks for Biomedical Image Segmentation*, International Conference on Medical Image Computing and Computer-Assisted Intervention, 2015. For example, the machine learning model can include three encoder layers and three decoder layers and the machine learning model may be trained using Stochastic Gradient Descent as the optimizer with an initial learning rate of 0.1. This initial learning rate can decay by a factor of 10 after every 20 epochs.

Example Datasets

The described systems and techniques have been evaluated on two datasets. Dataset 1 is a benchmark for video segmentation which includes 50 classes with precise annotations in both 480P and 1080P. To enlarge the scale factor, the 480P masks are downsampled by a factor of two. The machine learning model is trained on a 30-class 1080P training set with 240P low resolution masks and tested on a 20-class 1080P testing set. The scale factor is 4.5 for Dataset 1 and results are evaluated frame by frame.

Dataset 2 includes 100 digital images with average resolution of 7 k×7 k (ranging from 5k×5 k to 10 k×10 k) collected from a public photograph database. Object boundaries are manually annotated in the high resolution images and masks are downsampled by 8 times, 16 times, and 32 times for evaluation. The model trained on Dataset 1 is applied to Dataset 2.

Example Metrics

The boundary-based F score introduced by Perazzi et al., *A Benchmark Dataset and Evaluation Methodology for Video Object Segmentation*, Conference on Computer Vision and Pattern Recognition (CVPR), 2016, is used to evaluate boundary predictions. This F score is designed to evaluate quality of segmentation of boundaries. As this allows changing pixel tolerance by dilation, zero and one pixel dilation is applied to Dataset 1 and one and two pixel dilation is applied to Dataset 2 to measure how close a prediction is to a corresponding ground truth.

In this manner, the described systems are compared with methods that upsample a low resolution mask while referencing a high resolution mask and methods that refine an upsampled low resolution output. Bilinear Upsampling, Bilateral Solver, Joint Bilateral Upsampling (JBU), Guided Filtering, and Deep Guided Filtering are upsampling based approaches. Grabcut, Dense CRF, and STEAL are boundary refinement approaches. Curve-CGN and DELSE are active contour methods. U-Net Boundary is U-Net trained directly on Dataset 1. U-Net Strip is U-Net trained to directly predict target boundaries on strip images. As a baseline, U-Net Strip is trained using only the $L_{l_1}$ loss function.

TABLE 1

Dataset 1
Downsample Factor 4x

| Metric | F(0 pix) | F(1 pix) |
|---|---|---|
| Bilinear Upsampling | 0.171 | 0.521 |
| Grabcut | 0.232 | 0.541 |
| Dense CRF | 0.268 | 0.702 |
| Bilateral Solver | 0.274 | 0.569 |
| Curve-CGN | 0.076 | 0.160 |
| DELSE | 0.271 | 0.531 |
| STEAL | 0.171 | 0.348 |
| JBU | 0.175 | 0.447 |
| Guided Filtering | 0.129 | 0.349 |
| Deep Guided Filtering | 0.193 | 0.461 |
| U-Net Boundary | 0.320 | 0.656 |
| U-Net Strip (baseline) | 0.303 | 0.710 |
| Object Boundary Generation | 0.423 | 0.788 |

Table 1 presents F score data based on zero and one pixel dilation applied to Dataset 1 using masks downsampled from high resolution digital images by approximately 4x. As shown, the described systems have the highest F scores of 0.423 and 0.788 for zero and one pixel dilation, respectively.

TABLE 2

Dataset 2
Downsample Factor 8x

| Metric | F(1 pix) | F(2 pix) |
|---|---|---|
| Bilinear Upsampling | 0.116 | 0.194 |
| Grabcut | 0.063 | 0.121 |
| Dense CRF | 0.278 | 0.434 |
| Bilateral Solver | 0.207 | 0.277 |
| Curve-CGN | 0.021 | 0.033 |
| DELSE | 0.096 | 0.133 |
| STEAL | 0.282 | 0.457 |
| JBU | 0.140 | 0.231 |
| Guided Filtering | 0.121 | 0.195 |
| Deep Guided Filtering | 0.286 | 0.420 |
| U-Net Boundary | 0.170 | 0.297 |
| U-Net Strip (baseline) | 0.314 | 0.435 |
| Object Boundary Generation | 0.396 | 0.488 |

Table 2 presents F score data based on one and two pixel dilation applied to Dataset 2 using masks downsampled from high resolution digital images by approximately 8x. As shown, the described systems have the highest F scores of 0.396 for one pixel dilation and 0.488 for two pixel dilation.

TABLE 3

Dataset 2
Downsample Factor 16x

| Metric | F(1 pix) | F(2 pix) |
|---|---|---|
| Bilinear Upsampling | 0.150 | 0.187 |
| Grabcut | 0.020 | 0.053 |
| Dense CRF | 0.245 | 0.389 |
| Bilateral Solver | 0.185 | 0.247 |
| Curve-CGN | 0.018 | 0.028 |
| DELSE | 0.086 | 0.132 |
| STEAL | 0.151 | 0.255 |
| JBU | 0.117 | 0.184 |
| Guided Filtering | 0.092 | 0.145 |
| Deep Guided Filtering | 0.175 | 0.269 |
| U-Net Boundary | 0.139 | 0.197 |
| U-Net Strip (baseline) | 0.283 | 0.405 |
| Object Boundary Generation | 0.376 | 0.478 |

Table 3 presents F score data based on one and two pixel dilation applied to Dataset 2 using masks downsampled from high resolution digital images by approximately 16x. As shown, the described systems have the highest F scores of 0.376 and 0.478 for one and two pixel dilation, respectively.

TABLE 4

Dataset 2
Downsample Factor 32x

| Metric | F(1 pix) | F(2 pix) |
|---|---|---|
| Bilinear Upsampling | 0.070 | 0.106 |
| Grabcut | 0.000 | 0.000 |
| Dense CRF | 0.142 | 0.227 |
| Bilateral Solver | 0.156 | 0.216 |
| Curve-CGN | 0.012 | 0.028 |
| DELSE | 0.080 | 0.130 |
| STEAL | 0.090 | 0.144 |
| JBU | 0.055 | 0.090 |
| Guided Filtering | 0.060 | 0.097 |
| Deep Guided Filtering | 0.090 | 0.141 |
| U-Net Boundary | 0.068 | 0.108 |
| U-Net Strip (baseline) | 0.247 | 0.337 |
| Object Boundary Generation | 0.310 | 0.427 |

Table 4 presents F score data based on one and two pixel dilation applied to Dataset 2 using masks downsampled from high resolution digital images by approximately 32×. As shown, the described systems have the highest F scores of 0.310 for one pixel dilation and 0.427 for two pixel dilation. The F score data presented in Tables 1-4 indicates that the described systems and techniques achieve state of the art performance. Thus, the described systems improve technology for generating boundaries of objects depicted in digital images.

TABLE 5

Dataset 2

| Metric | Memory (MB) | Speed (seconds/image) |
| --- | --- | --- |
| STEAL | 7959 | 4231.0 |
| Curve-CGN | 17330 | 75.2 |
| DELSE | 17771 | 20.4 |
| U-Net Boundary | 17000 | 24.5 |
| Object Boundary Generation | 3300 | 2.51 |

The memory usage and speed data presented in Table 5 reflects implementation on a GPU. Metrics STEAL and U-Net Boundary could not be evaluated by processing complete high resolution images due to computational resource consumption. These metrics were evaluated on tiles or portions of the high resolution images and the data presented in Table 5 is based on processing the tiles. As shown, the described systems use an order of magnitude less RAM and also generate predicted boundaries in an order of magnitude less time. Thus, the described systems demonstrate the highest F scores and also improve performance of the computing device 102 by increasing computational efficiency of the computing device 102 for predicting boundaries of objects.

In one example, the described systems and techniques improve computing technology by transforming a two dimensional task into a one dimensional task. Since the strip image 314 is generated by extracting pixels from the digital image 118 which are normal to the points 310 along the upsampled curve 308, a machine learning model processing the strip image 314 determines how to move in the normal direction which is one dimensional instead of determining how to move in two directions which is a two dimensional task. In another example, performance of the described systems may be further improved by sampling the digital image 118 and stepping along the upsampled curve 308 in two or three pixel long steps. This reduces a size of the strip image 314 and further increases computational efficiency of the computing device 102. For example, when mapping, two or three pixel gaps can be connected using any technique or combinations of techniques.

Figure 6:
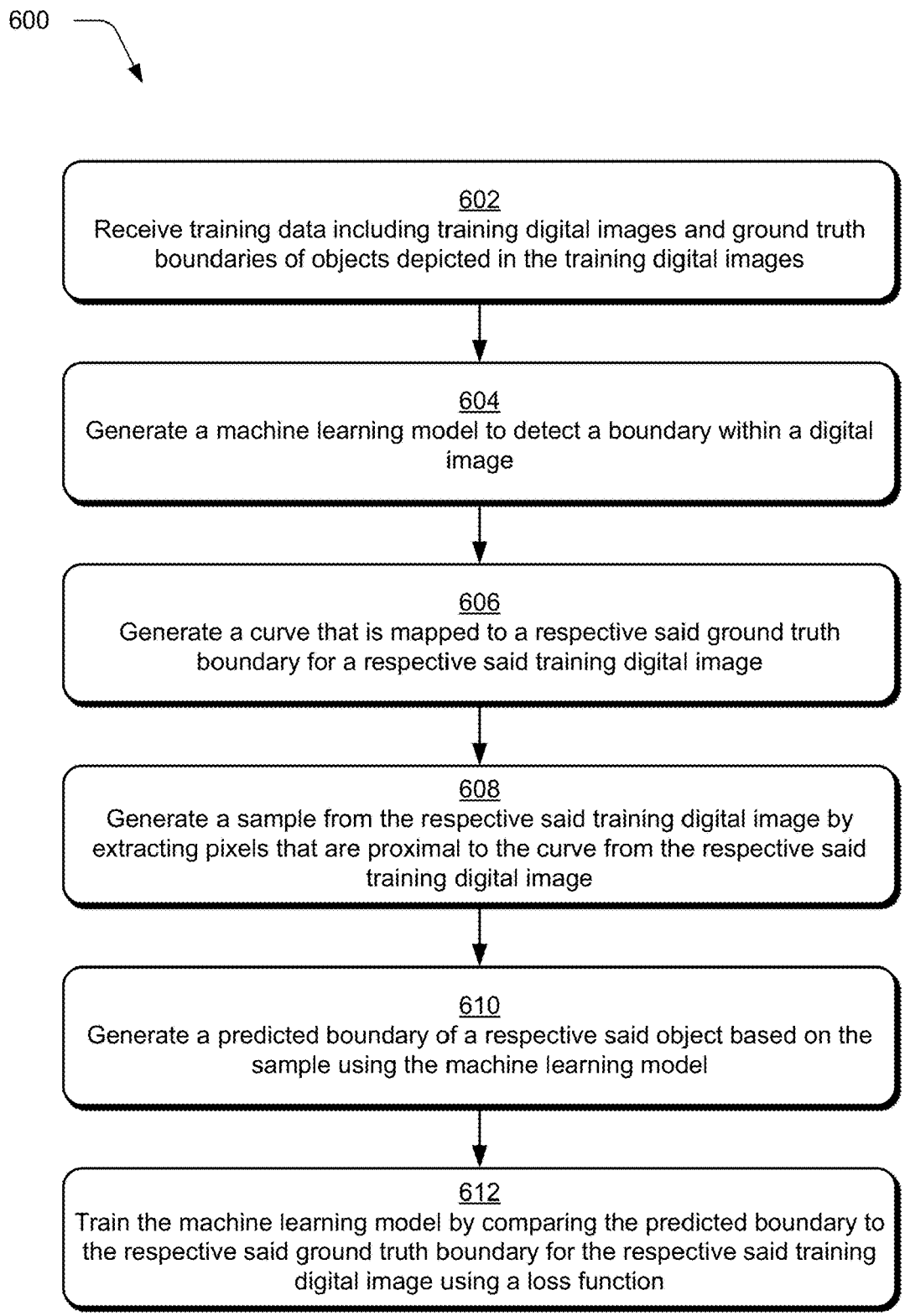
FIG. 6 is a flow diagram depicting a procedure in an example implementation in which a ground truth boundary of an object depicted in a digital image is extracted, a predicted boundary of the object is output, and a machine learning model is trained by comparing the ground truth boundary and the predicted boundary using a loss function.

FIG. 6 is a flow diagram depicting a procedure 600 in an example implementation in which training data including training digital images and ground truth boundaries of objects depicted in the training digital images is received and a machine learning model is trained using a loss function. Training data including training digital images and ground truth boundaries of objects depicted in the training digital images is received (block 602). The computing device 102 implements the boundary module 110 to receive the training data.

A machine learning model is generated to detect a boundary within a digital image (block 604). For example, the boundary module 110 generates the machine learning model. A curve that is mapped to a respective ground truth boundary for a respective said training digital image is generated (block 606). The boundary module 110 can generate the curve in one example. A sample from the respective said training digital image is generated by extracting pixels that are proximal to the curve from the respective said training digital image (block 608). For example, the computing device 102 implements the boundary module 110 to generate the sample.

A predicted boundary of a respective said object is generated based on the sample using the machine learning model (block 610). The boundary module 110 can generate the predicted boundary. The machine learning model is trained by comparing the predicted boundary to the respective said ground truth boundary for the respective said training digital image using a loss function (block 612). For example, the boundary module 110 trains the machine learning model using the loss function.

Figure 7:
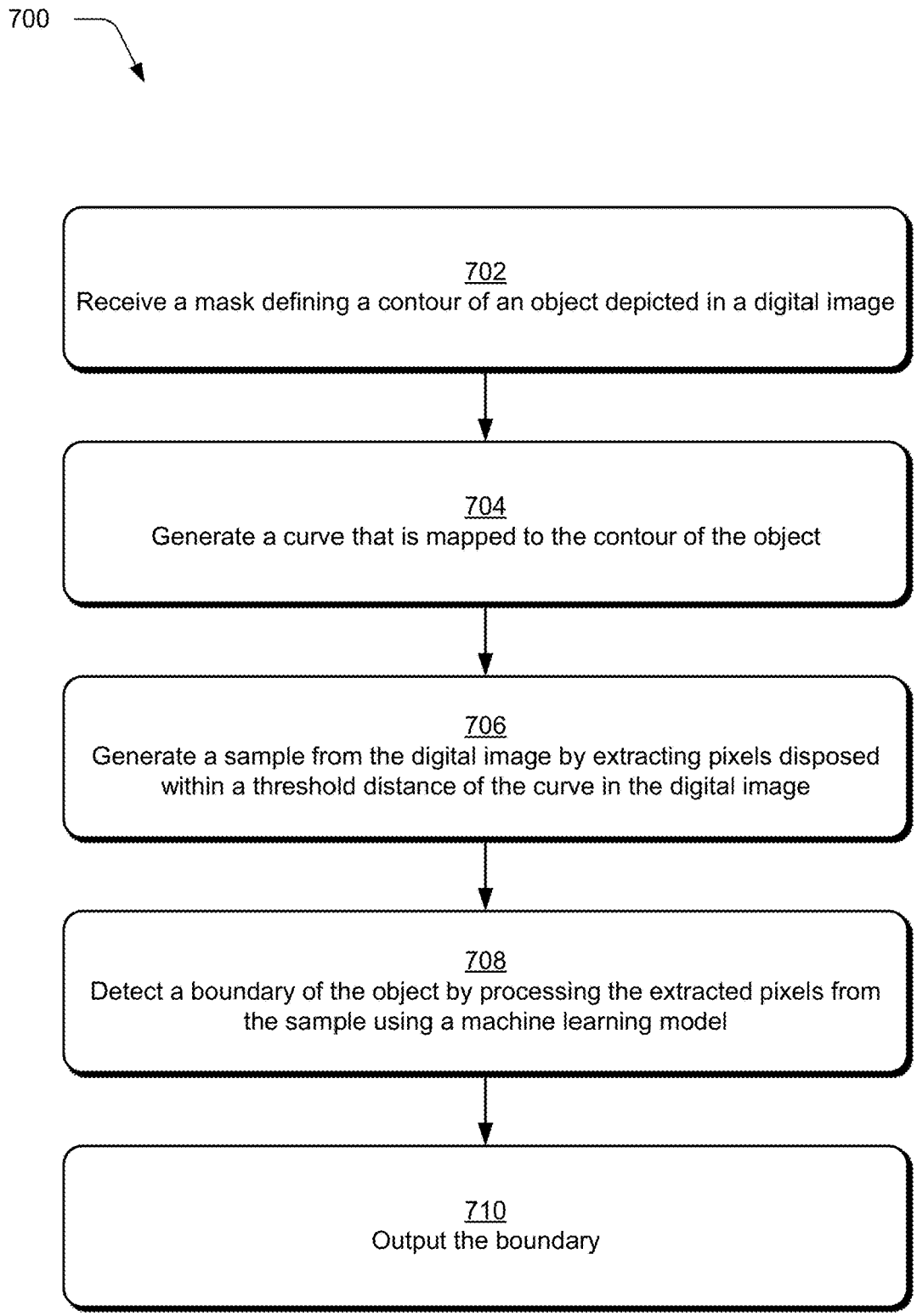
FIG. 7 is a flow diagram depicting a procedure in an example implementation in which a mask defining a contour of an object depicted in a digital image is received and a boundary of the object is detected using a machine learning model.

FIG. 7 is a flow diagram depicting a procedure 700 in an example implementation in which a mask defining a contour of an object depicted in a digital image is received and a boundary of the object is detected using a machine learning model. A mask defining a contour of an object depicted in a digital image is received (block 702). The computing device 102 implements the boundary module 110 to receive the mask defining the contour of the object in an example.

A curve that is mapped to the contour of the object is generated (block 704). For example, the boundary module 110 generates the curve that is mapped to the contour of the object. A sample is generated from the digital image by extracting pixels disposed within a threshold distance of the curve in the digital image (block 706). The boundary module 110 can generate the sample from the digital image.

A boundary of the object is detected by processing the extracted pixels from the sample using a machine learning model (block 708). The computing device 102 implements the boundary module 110 to detect the boundary of the object in one example. The boundary is output (block 710). For example, the boundary module 110 outputs the boundary.

Example System and Device

Figure 8:
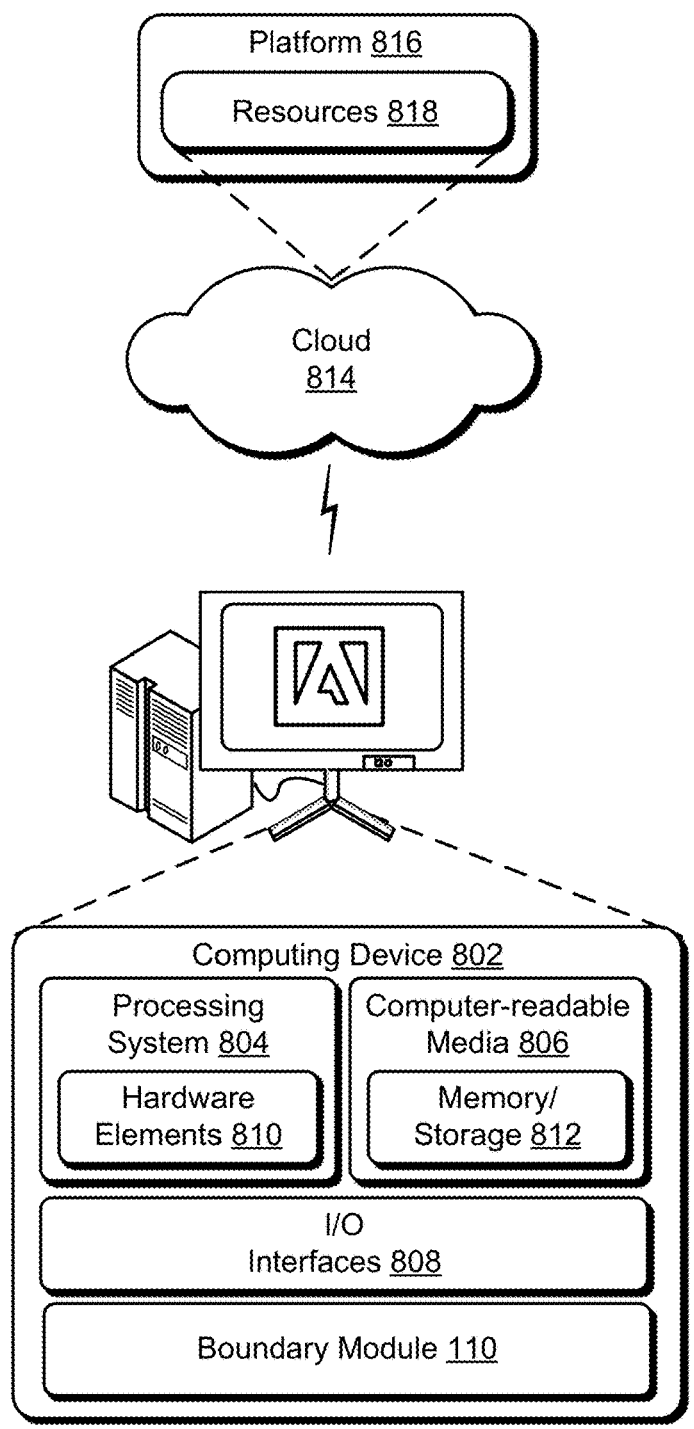
FIG. 8 illustrates an example system that includes an example computing device that is representative of one or more computing systems and/or devices that may implement the various techniques described herein.

FIG. 8 illustrates an example system 800 that includes an example computing device that is representative of one or more computing systems and/or devices that may implement the various techniques described herein. This is illustrated through inclusion of the boundary module 110. The computing device 802 may be, for example, a server of a service provider, a device associated with a client (e.g., a client device), an on-chip system, and/or any other suitable computing device or computing system.

The example computing device 802 as illustrated includes a processing system 804, one or more computer-readable media 806, and one or more I/O interfaces 808 that are communicatively coupled, one to another. Although not shown, the computing device 802 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 804 is representative of functionality to perform one or more operations using hardware. Accordingly, the processing system 804 is illustrated as including hardware elements 810 that may be configured as processors, functional blocks, and so forth. This may include implementation in hardware as an application specific integrated circuit or other logic device formed using one or more semiconductors. The hardware elements 810 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable media 806 is illustrated as including memory/storage 812. The memory/storage 812 represents memory/storage capacity associated with one or more computer-readable media. The memory/storage component 812 may include volatile media (such as random access memory (RAM)) and/or nonvolatile media (such as read only memory (ROM), Flash memory, optical disks, magnetic disks, and so forth). The memory/storage component 812 may include fixed media (e.g., RAM, ROM, a fixed hard drive, and so on) as well as removable media (e.g., Flash memory, a removable hard drive, an optical disc, and so forth). The computer-readable media 806 may be configured in a variety of other ways as further described below.

Input/output interface(s) 808 are representative of functionality to allow a user to enter commands and information to computing device 802, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 802 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 802. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 802, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 810 and computer-readable media 806 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 810. The computing device 802 may be configured to implement particular instructions and/or functions corresponding to the software and/or hardware modules. Accordingly, implementation of a module that is executable by the computing device 802 as software may be achieved at least partially in hardware, e.g., through use of computer-readable storage media and/or hardware elements 810 of the processing system 804. The instructions and/or functions may be executable/operable by one or more articles of manufacture (for example, one or more computing devices 802 and/or processing systems 804) to implement techniques, modules, and examples described herein.

The techniques described herein may be supported by various configurations of the computing device 802 and are not limited to the specific examples of the techniques described herein. This functionality may also be implemented all or in part through use of a distributed system, such as over a "cloud" 814 as described below.

The cloud 814 includes and/or is representative of a platform 816 for resources 818. The platform 816 abstracts underlying functionality of hardware (e.g., servers) and software resources of the cloud 814. The resources 818 may include applications and/or data that can be utilized while computer processing is executed on servers that are remote from the computing device 802. Resources 818 can also include services provided over the Internet and/or through a subscriber network, such as a cellular or Wi-Fi network.

The platform 816 may abstract resources 818 and functions to connect the computing device 802 with other computing devices. The platform may also serve to abstract scaling of resources to provide a corresponding level of scale to encountered demand for the resources that are implemented via the platform. Accordingly, in an interconnected device embodiment, implementation of functionality described herein may be distributed throughout the system 800. For example, the functionality may be implemented in part on the computing device 802 as well as via the platform 816 that abstracts the functionality of the cloud 814.

CONCLUSION

Although implementations of digital image boundary detection have been described in language specific to structural features and/or methods, it is to be understood that the appended claims are not necessarily limited to the specific features or methods described. Rather, the specific features and methods are disclosed as example implementations of object boundary generation, and other equivalent features and methods are intended to be within the scope of the appended claims. Further, various different examples are described and it is to be appreciated that each described example can be implemented independently or in connection with one or more other described examples.

What is claimed is:

1. In a digital medium boundary detection environment, a method implemented by a computing device, the method comprising:
    receiving, by the computing device, data defining a contour of an object within a digital image, wherein the data defining the contour of the object is defined as a mask for a downsampled version of the digital image;
    generating, by the computing device, a curve that is mapped to the contour of the object, wherein the curve has a resolution corresponding to a resolution of the digital image;
    generating, by the computing device, a sample from the digital image by extracting pixels from the digital image that are proximal to the curve;
    detecting, by the computing device, a boundary of the object by processing the extracted pixels of the sample using a machine learning model; and
    outputting, by the computing device, a representation of the boundary of the object for display in a user interface.

2. The method as described in claim 1, wherein the curve is a parametric curve.

3. The method as described in claim 2, wherein the curve is a B-spline curve, a kappa curve, or a Catmull-Rom curve.

4. The method as described in claim 1, wherein the generating the sample includes extracting the pixels along points of the curve.

5. The method as described in claim 4, wherein the extracted pixels are perpendicular to respective said points in the digital image.

6. The method as described in claim 1, wherein the generating of the curve includes nearest-neighbor interpolation, bilinear interpolation, or bicubic interpolation as applied to the contour of the object.

7. The method as described in claim 1, wherein the machine learning model includes a neural network that is trained using training digital images and ground truth boundaries of objects included in respective said training digital images.

8. The method as described in claim 7, wherein the machine learning model is trained using a loss function that measures an average distance between predicted boundaries for the training digital images by the machine learning model and respective ground truth boundaries for the training digital images.

9. The method as described in claim 8, wherein the loss function enforces a continuity constraint on boundaries predicted by the machine learning model for the training digital images.

10. In a digital medium environment, a method implemented by a computing device, the method comprising:
    receiving, by the computing device, training data including training digital images and ground truth boundaries of objects depicted in the training digital images; and
    generating, by the computing device, a machine learning model to detect a boundary within a digital image, the generating including:
        generating a curve that is mapped to a respective said ground truth boundary for a respective said training digital image, the respective said ground truth boundary defined using a mask having a resolution that is lower than a resolution of the respective said training digital image;
        generating a sample from the respective said training digital image by extracting pixels that are proximal to the curve from the respective said training digital image;
        generating a predicted boundary of a respective said object based on the sample using the machine learning model; and
        training the machine learning model by comparing the predicted boundary to the respective said ground truth boundary for the respective said training digital image using a loss function.

11. The method as described in claim 10, wherein the extracting of the pixels includes proceeding along points of the curve and extracting the pixels that are perpendicular to the points of the curve.

12. The method as described in claim 11, wherein the curve is a B-spline curve, a kappa curve, or a Catmull-Rom curve.

13. The method as described in claim 10, wherein the comparing includes measuring an average distance between the predicted boundary and the ground truth boundary.

14. The method as described in claim 10, wherein the training of the machine learning model includes enforcing a continuity constraint on the predicted boundary.

15. One or more non-transitory computer-readable storage media comprising instructions stored thereon that, responsive to execution by a computing device, causes the computing device to perform operations including:
    receiving data defining a contour of an object depicted in a digital image;
    generating a curve that is mapped to the contour of the object;

generating a sample from the digital image by extracting pixels disposed within a threshold distance of the curve in the digital image;

detecting a boundary of the object by processing the extracted pixels from the sample using a machine learning model, wherein the machine learning model includes a neural network that is trained using training digital images and ground truth boundaries of objects included in respective said training digital images; and outputting the boundary.

16. The one or more non-transitory computer-readable storage media as described in claim 15, wherein a mask defines the contour of the object and the mask has a resolution that is lower than a resolution of the digital image.

17. The one or more non-transitory computer-readable storage media as described in claim 15, wherein the generating of the curve employs nearest-neighbor interpolation, bilinear interpolation, or bicubic interpolation.

18. The one or more non-transitory computer-readable storage media as described in claim 15, the operations further including outputting a predicted boundary of the object by processing the sample using the machine learning model.

19. The one or more non-transitory computer-readable storage media as described in claim 18, wherein a continuity constraint is enforced on the predicted boundary.

20. The one or more non-transitory computer-readable storage media as described in claim 15, wherein the curve is a B-spline, a kappa curve, or a Catmull-Rom curve.

* * * * *